United States Patent Office 3,295,986
Patented Jan. 3, 1967

3,295,986
POWDERED FAT COMPOSITIONS AND PROCESS FOR MANUFACTURE
Irving M. Saslaw, Glen Rock, N.J., and John J. Brady, East Weymouth, Mass., assignors to General Foods Corporation, White Plains, N.Y., a corporation of Delaware
No Drawing. Filed Dec. 17, 1964, Ser. No. 419,219
14 Claims. (Cl. 99—123)

The present application is a continuation-in-part of our co-pending application Serial No. 238,262, filed November 16, 1952, now abandoned, the latter being a continuation-in-part of our application Serial No. 787,798, filed January 20, 1959, also now abandoned.

This invention relates to an improved powdered free flowing fat composition and to a process for preparing the same.

Powdered fat compositions consisting generally of small particles of fat encased in a coating of edible water-soluble, proteinaceous and carbohydrate solids and mixtures thereof have found particular utility in various food products such as cakes, pastries, bread, toppings, and the like. These compositions have been formed by drying emulsions of shortening, fat, and non-fat milk solids either by spray drying, drum drying or the like to provide a powdered free flowing composition. Instead of non-fat milk solids, proteinaceous materials such as gelatin and sodium caseinate, carbohydrate materials such as starches and sugars have been employed either separately or in combination as edible encapsulating solids. Furthermore, these improved powdered fat products have been prepared employing also gums such as cellulose ethers, gum acacia, and gum tragacanth, and "emulsifiers" such as lecithin, and edible partial esters of propylene glycol and the higher fatty acids, particularly those saturated fatty acids having a chain length of $C_{12}$ to $C_{22}$ carbon atoms such as stearic, lauric, behenic, palmitic, and myristic acid. The particular desirability of these partial esters of the glycols for use as emulsifiers in the improved dry powdered fat composition has also been disclosed in application, Serial No. 600,384, filed July 27, 1956, now U.S. Patent 2,913,342.

These powdered fat compositions offer the advantages of ease of handling and of incorporation with other dry free flowing ingredients during the preparation of various food products. A large potential use of a powdered fat composition is in prepared cake mixes. The use of dry powdered shortenings provides a great advantage to a cake mix manufacturer, by eliminating the costly and time-consuming creaming operation. A powdered shortening is also preferred over conventional modes of incorporating plastic and the like shortenings in dry mixes for bakery products because it affords the opportunity to emulsify the fat phase in a matrix of water-soluble materials with the consequent result of lessening the effort required for proper dispersion of the fat in the batter and increasing control of the manner in which the fat becomes available for effective cooperation with the farinaceous ingredients, the sugar, and the leavening agent in a mix as it is hydrated to a batter.

Dried emulsions containing fat for use in preparing whipped toppings of the type disclosed in application, Serial No. 600,384, now U.S. Patent No. 2,913,342, are also known. These materials offer the advantage of freedom from spoilage upon storage for long periods of time due to low moisture content and, in addition, permit greater ease of handling due to their free flowing character. Improvement of the whippability and the texture of the reconstituted whip has been achieved by the use of the partial esters of propylene glycol as the emulsifier and the use of proteinaceous and carbohydrate encapsulating solids at the matrix for the fat, as disclosed in said U.S. Patent No. 2,913,342.

The aforementioned dried emulsions, while exhibiting good whippability and having the texture of natural whipped cream when reconstituted, have been found to exhibit a tendency to re-emulsify with a consequent loss of texture, whippability, and overrun after having been subjected to prolonged storage at temperatures above 80° F. Prior to the present invention, when such emulsion concentrates, having been subjected to prolonged storage at elevated temperatures, were reconstituted in liquids such as water or milk with or without subsequent whipping or beating, the resultant combination of such concentrates and liquid would tend to re-emulsify and form a more or less stable liquid emulsion. This emulsion, when beaten, would not whip appreciably but rather would form a homogeneous blend of milk and concentrate in which the fat is finely dispersed.

It has been found that by the use of dried emulsions containing fats having a controlled dilatation, thereby increasing the solids content index of the total fat phase of the dried emulsion at temperatures below the melting point of the major constituents of the fat phase, the whippability, texture, freedom from churning out of the fat, overrun, and generally improved nature of the whip can be achieved upon reconstitution with a liquid.

Further, it has been discovered that an increase in the solids content index of the fat phase makes possible the use of substantially smaller quantities of dried emulsion to achieve the same performance on whipping as that shown by similar emulsions employing fat phase of a lesser solids content index.

It appears, therefore, that in forming dried emulsions of high fat content of the type disclosed herein not only the nature of the fat-encapsulating solids and emulsifying agents employed is critical to obtain a satisfactory whip under all conditions of use, but also the very nature and properties of the fat phase as well. Firstly, those fats having specific dilatometric properties and characteristic solids index sufficient to stabalize the dried emulsion at temperatures above mouth temperature must be employed to achieve a superior whipped product which will not deteriorate under extreme temperature variations encountered during prolonged storage of the product. Secondly, since the solids content index of the total fat phase is the primary factor leading to stability of the whip, the amount of fatty emulsifiers added to make up the fat phase also must be limited so as to yield a solids index for the total fat phase meeting the critical specifications herein disclosed.

Moreover, the fat phase should exhibit a plastic range such that it will melt readily at or about mouth temperature. Particularly, the fat phase should show a rapid decrease in solids content over a range between room temperature and body temperature so that it will give a cooling sensation in the mouth. Thus it is highly desirable that between 70° F. and 100° F. there be a sharp drop in the solids content index of the fat phase.

It is therefore an object of the present invention to provide an improved dried emulsion having superior stability, taste, performance, and texture by providing a composition containing a fat phase of "controlled dilatation" and solids content index.

It is a further object of the present invntion to provide a permanently stabilized dried emulsion wherein the fat phase and encapsulating solids perform effectively upon reconstitution with aqueous liquids in preparing food products generally.

It is a further object of this invention to provide a permanently stabilized powdered fat composition which is not subject to churning out of the fat component upon subsequent reconstitution of the powder into a whipped product.

Another specific object of this invention is to provide an improved dried emulsion which, upon reconstitution with milk or water and subsequent whipping, provides an edible emulsion such as a whipped topping which combines the properties of superior mouth feel, overrun, whipping ease, texture, appearance, and stability after having been subjected to temperatures above average room temperature for prolonged periods of time.

It is a further object of this invention to provide a powdered fat composition able to be stored at temperatures up to 110° F. or higher for prolonged periods of time and yet capable of yielding a topping having properties of high overrun, whipping ease, and superior texture and appearance when reconstituted with milk or water.

These and other objects of the present invention will be more fully developed hereinafter.

It has now been found that a dried emulsion containing a fat, the aforementioned encapsulating agent, and an emulsifying agent provides a powdered fat composition capable of effectively releasing its fat content from its matrix of encapsulating solids upon contact with aqueous liquids under all conditions of prior storage and use, when there is employed as the basic fat component a fat which has been selectively hydrogenated with respect to degree and type of hydrogenation, so as to yield a fat having a high specific solids content index after having been subjected to the extreme ranges of temperature encountered during storage. The preferred fats employed in our dried emulsion are characterized as having a congeal point between about 30–40° C. where the term "congeal point" refers to the lowest temperature at which a liquid fat will flow when placed in a test container and inverted.

Although the illustrative examples set forth disclose various fats as, for example, a hydrogenated cottonseed oil having a Wiley melting point of 115° F.±2° F., a hydrogenated palm kernel oil having a Wiley melting point of 113° F.±2° F., a hydrogenated coconut oil having a Wiley melting point of 102° F.±4° F., as preferred high solids content index fats, our invention is not limited to the use of particular fats but comprehends the use of any fat independent of specific melting points, congeal points, iodine values, etc., so long as the fat meets the following qualifications: (a) The particular fat has a melting point such that it will readily melt at or about mouth temperature and will not retain a coarse, lumpy texture because of excessively high melting point which will not give a sharp dissolution in the mouth. (b) The particular fat has a solids content index such that at temperatures of storage either above or below the melting point of the particular fat the solids to liquid ratio or percent solids present in the total fat phase will not drop below a minimum value of solids content index for the particular fat necessary to preserve stability of the dried emulsion when reconstituted with liquid. Thus, hydrogenated and partially hydrogenated edible vegetable and animal oils as, for example, cottonseed oil, palm kernel oil, coconut oil, soybean oil, corn oil, lard oil and the like, may be employed.

For dried emulsions containing such fats, e.g., hydrogenated cottonseed oil, hydrogenated palm kernel oil, hydrogenated coconut oil and the like, and one or more emulsifying agents making up a total fat phase, a minimum solids content index for that fat phase of at least 3 within the temperature range of 50–110° F., has been found to be essential to maintain a stabilized dried emulsion of this particular fat, although it appears that even lower solids content indexes present at temperatures in excess of 110° F. exert a beneficial effect upon stability of the reconstituted dried emulsion.

It has also been found that the blending of a fat which has been selectively hydrogenated with an emulsifying agent including other esters such as partial esters of a glycol and a higher fatty acid having a chain length of $C_{12}$ to $C_{22}$ carbon atoms, e.g., propylene glycol monostearate, propylene glycol monopalmitate, etc. partial esters of glycerine and a like fatty acid, especially mono- and di-glycerides, e.g., glycerol monostearate, glycerol monopalmitate, glycerol monooleate, etc, but also polyglycerol esters, e.g., decaglycerol decastearate; esters of sorbitol and a like fatty acid as well as polyoxyalkylene derivatives thereof; mixed esters obtained as products from the reaction of a hydroxy carboxylic acid and partial glycol esters and/or partial glycerol esters, e.g., citric acid ester of propylene glycol monostearate, glycerol lacto palmitate, glycerol lacto stearate, glycerol lacto oleate, etc.; lecithin, hydroxylated lecithin; and mixtures thereof, so as to arrive at a "total fat phase" solids content index which meets the specified requirements of solids index set forth herein, yields a dried emulsion having an unexpected whip stability and texture and a complete freedom from the churning out of fat particles upon reconstitution of the whip. The result achieved is not predictable from a mere consideration of any of the recognized properties of the fat phase components involved, such as saponification number, congeal point of the fat, or iodine number. Furthermore, the resultant stability is not predictable from a general use of all fats having a particular characteristic noted above but can only be achieved by the addition to the whipping composition of a total fat phase having the dilatometric properties and high solids content index specified herein.

The fats and oil in the present invention are characterized as being "substantially solid" at temperatures below body temperature and "substantially liquid" at temperatures above body temperature. The term "substantially solid" as herein employed does not refer to the visible physical state of the fat but rather refers to its relative solids content as herein defined. For purposes of the present invention, a fat phase is considered to be "substantially solid" which exhibits a solids content of not less than 19.6 percent and the liquid content not more than 80.4 percent at 30° C. Conversely, a fat phase is considered to be "substantially liquid" which exhibits a solids content of not more than 12 percent and liquid content of not less than 88 percent at a temperature of 40° C. The temperatures selected representing conditions below and above body temperature. The fat phase described above will exhibit a sharp plastic range and easily melt at mouth temperature yet is found to be stable under storage temperatures considerably above body temperature.

The term "substantially crystalline" as employed herein refers to the configuration of the solids portions of the fat phase regardless of whether the fat phase is substantially solid or substantially liquid as defined above. The term "tempering" as employed herein also has a specific meaning and is defined to mean cooling of the fat to induce the formation of a crystalline structure in the solids portion of the fat phase.

The particular cottonseed oil component of the total fat phase employed may be hydrogenated to a high solids content by one of the following procedures.

A

A quantity of an edible grade of refined and bleached cottonseed oil with an iodine value of 110 is hydrogenated with pure hydrogen in a dead-end convertor for a period of 120 minutes under a hydrogen pressure of 30 lbs./sq. inch and a temperature of 280° F. in the presence of an active nickel catalyst concentration of 0.10% on the basis of the oil. Enough cottonseed stearine is then added to this hydrogenated cottonseed oil to result in a fat mixture with an iodine value of 62, a Wiley melting point of 115° F., and a solids content index of 21 at 92° F. or 7 at 110° F.

B

A quantity of an edible grade of refined and bleached cottonseed oil with an iodine value of 110 is hydrogenated with pure hydrogen in a dead-stop convertor for a period of 175 minutes under a hydrogen pressure of 50 lbs./sq.

inch and a temperature of 275° F. in the presence of an active nickel catalyst concentration of 0.10% on the basis of the oil. The hydrogenated cottonseed oil had an iodine value of 60, a Wiley melting point of 113° F., and a solids content index of 41 at 70° F. or 11 at 100° F.

The hydrogenated fat obtained above was then admixed with propylene glycol monostearate and lecithin to yield a total fat phase solid index meeting the following specifications.

| Temperature: | Solids content index (SCI) |
|---|---|
| 50° F. | 50±3 |
| 70° F. | 40±3 |
| 80° F. | 30±2 |
| 92° F. | 20±2 |
| 100° F. | 9±3 |
| 110° F. | 5±2 |

The above values of solids content index of the total fat phase at 100° and 110° F. are considered essential to the achievement of stabilization of the powdered fat composition when such is to be reconstituted after storage.

Following are specific examples of the dried emulsions of this invention. Unless otherwise indicated, the phrase "propylene glycol monostearate" employed herein refers to the ester of propylene glycol and triple pressed stearic acid which itself contains approximately 45% stearic acid and 55% palmitic acid, and wherein the mono-ester is approximately 52%. Hydroxylated soy lecithin refers to a soy phosphatide composed of 65% lecithin and 35% soy bean oil which has been partially hydroxylated at the double bonds of the fatty acid groups in the lecithin by means of hydrogen peroxide treatment with lactic acid, the hydroxylated lecithin having an iodine number of about 80.

*Example 1*

| Ingredients: | Percent parts by weight |
|---|---|
| Hydrogenated cottonseed oil (SCI, 11±2 at 100° F., Wiley M.P., 115° F.) | 49 |
| Propylene glycol monostearate (approximately 52% mono-esters) | 10 |
| Hydroxylated soy lecithin | 1 |
| Sucrose | 30 |
| Sodium caseinate | 10 |

In preparing a dried emulsion from the above ingredients the high solid index selectively hydrogenated cottonseed oil is mixed and melted together with propylene glycol monostearate and lecithin at a temperature of 160–180° F., the total solids content index of the total fat phase being attained by the addition of the propylene glycol monostearate and lecithin to the hydrogenated cottonseed oil to bring the solids content index of the total fat phase to the high solids index set forth as follows.

| Temperature: | Solids content index (SCI) |
|---|---|
| 50° F. | 50 |
| 70° F. | 40 |
| 80° F. | 30 |
| 92° F. | 17 |
| 100° F. | 13 |
| 110° F. | 5 |

At the same time, the sucrose and sodium caseinate are dissolved in fifty parts by weight of water and heated to 140° F. The two mixtures are combined with simple mixing and homogenized in a Manton-Gaulin homogenizer at 1500 p.s.i. (gauge). The emulsion after homogenization is fed directly to a spray dryer operating at an inlet temperature of 380°–390° F. and an outlet temperature of about 220° F.

The spray dryer is of conventional design and comprises a cylindrical tower ten feet in diameter and thirty feet in height. The dryer is of the co-current type wherein warmed air is introduced at the top and removed at the bottom. The nozzle is located in the center of the dryer, approximately 2.5 feet from its top and adapted to direct the atomized solution downwardly in a conical spray pattern. Although we make reference herein to a vertical-type spray dryer, a horizontal-type spray dryer may also be employed.

The emulsion is fed to the nozzle at a pressure of approximately 1500 p.s.i. (gauge). The dried emulsion has a density of about 0.20 gram per cubic centimeter and a moisture content of about 1.0%. The resulting particulate powder is cooled to from 35–45° F. for a time interval of 3–6 days to temper and crystallize the fat phase of the composition.

*Example 2*

An emulsion was prepared from the ingredients of Example 1 except that the sodium caseinate and sucrose were dissolved in 400 parts by weight of water prior to mixing with the fat phase. The emulsion was then fed to the pinch between a pair of steam heated twelve-inch diameter rolls rotating in opposite direction at about 1 r.p.m. and having an equilibrium steam pressure of 1–5 p.s.i. (gauge). A film of material was eventually dried and removed from the drum by a pair of doctor blades located at a point approximately 180 degrees from the point at which the emulsion first contacted the drum. A blast of cool air is uniformly introduced to the plastic emulsion under each drum prior to the emulsion being scraped off the drum between the doctor blades. The product is removed from the drum between the doctor blades in the form of a thin sheet which breaks up into a pulverulent powder-like composition. This composition is cooled in the manner described in Example 1 and is operable in the formation of a reconstituted fat composition.

*Example 3*

A powdered topping composition was prepared by the process of Example 1 using sodium caseinate as the proteinaceous foam strengthening material of the aqueous phase and, moreover, included the introduction of whey solids.

| Ingredients: | Percent parts by weight |
|---|---|
| Hydrogenated cottonseed oil (SCI, 5±2 at 110° F., Wiley M.P., 115° F.) | 36 |
| Propylene glycol monostearate (approximately 52% mono-esters) | 13 |
| Hydroxylated soy lecithin | 1 |
| Sodium caseinate | 7 |
| Gum arabic | 1 |
| Whey solids | 17 |
| Sucrose | 25 |

Seven pounds of sodium caseinate, 17 pounds of whey solids, one pound of gum arabic, and 25 pounds of sucrose were dissolved in 50 pounds of water and then emulsified with the fat phase in accordance with the procedure of Example 1. The dried product also was tempered in accordance with the procedure of Example 1. The portion was then whipped in homogenized whole milk standing at refrigerator temperature in a household mixer at high speed (850–900 r.p.m.) for two to three minutes. The resulting product had an overrun of over 200%, and upon flavoring, had the texture, taste, and appearance of natural whipped cream as well as enhanced stability of whip after having been subjected to prolonged storage at high temperatures.

The unexpectedly superior product obtained by the use of high dilatation fats in the formation of the dried emulsion is believed to be related to the fact that the quality of whip obtained upon reconstitution of such a material is inversely affected by the degree of dispersion of fat and water after such reconstitution and beating. Those factors (solids index) which tend to inhibit the formation of a stable emulsion will favor the formation of a good whip.

Example 4

A powdered topping composition was prepared by the process of Example 1 substituting an equal quantity of hydrogenated palm kernel oil of SCI 11±2 at 100° F. and a Wiley M.P. of 112–115° F. for the hydrogenated cottonseed oil of that example. The total fat phase so prepared exhibited a particularly sharp drop in solids content at the critical range of 70° F. to 100° F. The solids content of the fat phase was as follows.

| Temperature: | Solids content index (SCI) |
| --- | --- |
| 50° F. | 70 |
| 70° F. | 70 |
| 80° F. | 36 |
| 92° F. | 10 |
| 100° F. | 8 |
| 110° F. | 4 |

The sharp decrease in solids content of the fat phase from 70 at 70° F. to 8 at 100° F. results in a pleasant, cool sensation in the final product, this sensation being known as good "mouth feel."

Example 5

| Ingredients: | Percent parts by weight |
| --- | --- |
| Hydrogenated coconut oil (SCI, 1.4 at 100° F., Wiley M.P., 102° F.) | 46 |
| Tristearin | 3 |
| Propylene glycol monopalmitate | 9.75 |
| Glycerol monostearate | 0.25 |
| Hydroxylated soy lecithin | 1 |
| Sucrose | 30 |
| Sodium caseinate | 10 |

A powdered topping composition was prepared by the process of Example 1 substituting a hydrogenated, fractionated and modified coconut oil for the hydrogenated cottonseed oil and a mixture of propylene glycol monopalmitate and glycerol monostearate for the propylene glycol monostearate of that example. The total fat phase so prepared exhibited a particularly sharp drop in solids content at the critical range of 70° F. to 100° F. The solids content of the fat phase was as follows.

| Temperature: | Solids content index |
| --- | --- |
| 50° F. | 75.5 |
| 70° F. | 71.8 |
| 80° F. | 37.9 |
| 92° F. | 12.0 |
| 100° F. | 9.9 |
| 110° F. | 6.4 |

Example 6

| Ingredients: | Percent parts by weight |
| --- | --- |
| Hydrogenated coconut oil (SCI, 1.4 at 100° F., Wiley M.P., 102° F.) | 45 |
| Tristearin | 3 |
| Glycerol lacto palmitate | 8 |
| Glycerol lacto oleate | 1 |
| Glycerol monostearate | 2 |
| Hydroxylated soy lecithin | 1 |
| Sucrose | 30 |
| Sodium caseinate | 10 |

A powdered topping composition was prepared by the process of Example 1 substituting a hydrogenated, fractionated and modified coconut oil for the hydrogenated cottonseed oil and a mixture of glycerol lacto palmitate, glycerol lacto oleate and glycerol monostearate for the propylene glycol monostearate of that example. The total fat phase so prepared exhibited a particularly sharp drop in solids content at the critical range of 70° F. to 100° F. The solids content of the fat phase was as follows.

| Temperature: | Solids content index |
| --- | --- |
| 50° F. | 55.6 |
| 70° F. | 58.6 |
| 80° F. | 50.8 |
| 92° F. | 20.9 |
| 100° F. | 13.0 |
| 110° F. | 6.6 |

While ranges of SCI have been set forth hereinbefore as being in accordance with the present invention, a most preferred range would be that listed below.

| Temperature: | Solids content index (SCI) |
| --- | --- |
| 50° F. | 50–75 |
| 70° F. | 30–75 |
| 80° F. | 20–60 |
| 92° F. | 10–40 |
| 100° F. | 3–13 |
| 110° F. | 3–8 |

In accordance with the most preferred SCI levels as indicated above, a drop of at least about 50 in SCI from 70° F. to 100° F. is to be most desired. However, a decrease in the 70°–100° F. range of at least about 30 will also give a pleasing mouth feel.

The particular fats which we employ in our stabilized fat composition are characterized by their specific dilatometric properties. Dilatometry is a technique for the measurement of phase transformation in fats and oils by measurement of volume changes in the fat when the same has been subjected to variations in temperature. Knowing the specific thermal expansion of the solid and liquid fat phases, the relative percent by volume of solids present may be determined and expressed in terms of percent solids or solids content index. The critical relationship existing between solids content index of selected oils having different dilatation and the final performance of these in whipped toppings following storage of the dried fat emulsions at various temperatures is presented by the following Tables A, B, and C.

TABLE A.—QUALITY CONTROL ANALYSIS

| Fat Employed (HCSO) | Batch No. | Iodine Value | Free Fatty Acid (percent) | Wiley M.P. (° F.) |
| --- | --- | --- | --- | --- |
| Sample No. 1 | S1 | 60.4 | 0.027 | 117.2 |
| Sample No. 2 | S7 | 48.1 | 0.033 | 114.8 |
| Sample No. 3 | S6 | 77.9 | 0.027 | 116.6 |
| Sample No. 4 | S8 | 71.7 | 0.017 | 114.1 |

Table A describes the four types of fats (HCSO=hydrogenated cottonseed oil) tested as representative of the fats normally employed in the preparation of the dried fat emulsions used in the preparation of whipped toppings. S1 is a high dilatation fat, S7 a medium dilatation fat, and S6 and S8 low dilatation fats.

TABLE B.—DILATOMETRIC ANALYSIS

| Fat Employed (HCSO) | Batch No. | Temperature (° C.) | | | | | | |
| --- | --- | --- | --- | --- | --- | --- | --- | --- |
| | | 0 | 5 | 10 | 20 | 30 | 40 | 50 |
| Sample No. 1 | S1 | 55.3 | 54.3 | 49.8 | 38.1 | 27.1 | 12.0 | 6.2 |
| Sample No. 2 | S7 | 40.4 | 42.8 | 40.7 | 31.5 | 19.6 | 7.7 | 0.0 |
| Sample No. 3 | S6 | 34.2 | 35.0 | 34.2 | 22.6 | 13.3 | 6.3 | 0.0 |
| Sample No. 4 | S8 | 30.9 | 33.4 | 33.2 | 24.7 | 13.9 | 7.6 | 0.2 |

Table B illustrates the representative dilatometric properties of the same fats of Table A at varying degrees of temperature, the figures being presented as solids content index or percent by volume of solids. It is seen that S1 represents the fat having the highest solids index of the four representative fats although such difference would not appear from a mere consideration of the physical data presented in Table A.

Table C represents the initial performance data on whipped products prepared by reconstitution of the dried fat emulsions in cold homogenized milk by mixing 60 grams of the dried emulsion in one-half cup milk, employing each of the fats disclosed in Tables A and B above, each of the fat compositions having been rapidly cooled upon collection from the spray dryer in a Holoflite cooler, at the stage where they are dried emulsions, to 50° F. and tempered at 40° F. for 3–6 days. The tempering of the cooled dried fat emulsion tends to crystallize the fat particles and appears to give the fat the characteristic of remaining in the substantially solid state over a protracted period of time even though subjected to extreme temperatures such as those encountered in storage. The fat, therefore, may be said to exhibit a "memory" which enables it to aid in stability of the reconstituted whip due to the presence of at least some portions of the fat in the solid state at all times during storage and reconstitution. Although initial cooling to about 50° F. and tempering at temperatures slightly below this for 3–6 days appears to give best results, tempering for lesser amounts of time at lower temperatures may also be employed.

TABLE C.—INITIAL PERFORMANCE DATA

| Sample No. | Whip Time (min.) | Overrun, Percent | Viscosity (H.U.) | Whip Ratio | Churn Tolerance (min.) |
|---|---|---|---|---|---|
| S1 | 2′50″ | 281 | 40 | 14.2 | 8 |
| S7 | 3′15″ | 291 | 32 | 10.2 | 8 |
| S6 | 3′30″ | 303 | 24.5 | 7.0 | 8 |
| S8 | 3′30″ | 279 | 27 | 7.7 | 8 |

(a) Homogenizing conditions for S1 were 1000 p.s.i.g. nozzle pressure, 1500 p.s.i.g. total pressure. In all others the conditions were 1000 p.s.i.g. nozzle pressure, 2000 p.s.i.g. total pressure.

(b) Whip ratio is defined as $$\frac{viscosity}{whip\ time}$$

(c) Churn tolerance is the total whip time in minutes before churning out occurred.

(d) Helipath units (H.U.) are equivalent to Brookfield units of viscosity, the only difference being that the viscosity is measured in three dimensions instead of two by means of a helical or screw shaped spindle.

As seen in the above Table C, Sample S1 representing the whip prepared from the high dilatation fat of Tables A and B exhibited an unexpectedly short whip time, a high degree of overrun, as well as viscosity, and a high whip ratio, as compared to the whip prepared from the low dilatation fats.

A series of plant runs have been made combining as an emulsifier propylene glycol monostearate derived from 70% stearic acid, lecithin, and high dilatation fats such as Sample No. 1 above as well as Sample No. 7 representing another high solids content index fat prepared from a separate source. The following Table D summarizes performance test results on these samples compared to samples containing low solids content index fats also prepared separately and represented by Samples No. 5 and No. 6 after one day and two and one-half days' storage at 110° F. The storage tests were pointed toward the severe conditions of storage encountered in warehouses, railroad box cars, and enclosed areas where temperature and humidity would greatly surpass that of the normal room conditions.

For the purpose of evaluating the performance of samples, the rate of whipping and the helipath viscosity of the topping obtained during the whipping are the factors which must be considered inasmuch as they primarily determine the stability of the product. In order to compare sample performance the whip ratio has been found to be very useful and accurate. In rating sample performance in respect to stability, the following scale is used:

(a) Whip ratio of 2.8 or lower represents a product which would be unacceptable. In terms of whip time and viscosity, the topping would have reached a maximum of 17 at 6.0 minutes' whipping.

(b) Whip ratio of 2.8 to 5.5 represents a product which would be rated poor. Viscosities and whip time would range from 18 units at 6.0 minutes to 24 at 4.5 for this class of product.

(c) Whip ratios of 5.5 and above describe acceptable product which improves in performance as the whip ratio increases with particular respect to topping flexibility in recipes and performance in less efficient types of mixers including portable electric and hand beaters.

TABLE D.—EFFECT OF HCSO SOLIDS INDEX IN PRODUCTS USING 70% STEARIC PGMS STORAGE PERIODS (AT 110° F. TEMPERATURE)

| Sample | 24-Hour | | | | 84-Hour | | | |
|---|---|---|---|---|---|---|---|---|
| | Whip Time (min.: sec.) | Overrun (percent) | Viscosity (Helipath Units) | Whip Ratio | Whip Time (min.: sec.) | Overrun (percent) | Viscosity (Helipath Units) | Whip Ratio |
| Sample 1 (S1—high SCI) | 4:00 | 279 | 30 | 7.5 | 3:48 | 303 | 22 | 8.4 |
| Sample 5 (low SCI) | 6:00 | 238 | 16 | 2.7 | 6:00 | 226 | 21 | 3.5 |
| Sample 6 (low SCI) | 6:00 | 198 | 15 | 2.5 | 6:00 | 198 | 13 | 2.2 |
| Sample 7 (high SCI) | 3:43 | 279 | 28 | 7.6 | 3:38 | 303 | 28 | 7.7 |

As seen by the above table, all fats tested having a high solids content index demonstrate unexpectedly high whip ratio, overrun, and stability. For example, with respect to the sample prepared employing Sample 1, after two and one-half days' storage at 110° F. temperature, it showed a whip ratio of 8.4 or almost two and one-half times the whip ratio of the low solids content oil (Sample 5) and almost four times as great a whip ratio as the other low solids content fat-containing dried emulsion (Sample 6). It appears, therefore, that the use of high solid index fat is essential to the stabilization of dried fat compositions which are to be reconstituted with water to form products such as a whipped topping. The use of these specifically hydrogenated fats appears to preserve the texture and stability of the whip formed upon reconstitution in spite of the high temperatures which the dried emulsion may frequently be subjected to under conditions of storage, primarily in transportation or confinement in areas where the temperature may rise above 80° F. and where temperatures of the order of 115° F. are frequently encountered. It further appears that the solids index of the entire fat phase, which includes the solids content index of the hydrogenated fat as well as emulsifying agents added, is critical. The slight depression of the total solids content of the fat phase by an emulsifier containing some degree of unsaturation such as lecithin is compensated for by the presence of a particular fat having a solids content index sufficiently high to elevate the solids content index of the total fat phase to a level sufficient to impart stability to the reconstituted dry fat emulsion.

It will be understood that while the invention has been described in part by means of specific examples, reference should be had to the appended claims for a definition of the scope of the invention, and while the solids content index has been expressed for particular fats such as hydrogenated cottonseed oil, hydrogenated palm kernel oil, and hydrogenated coconut oil, it is not intended that this invention be limited to only these particular fats, but it is clear that any fat having a solids content index within the limits set forth herein would be operable in the manner of this invention. Likewise, instead of the propylene glycol monostearate and propylene glycol monopalmitate of certain of the above examples, any partial ester of a glycol and a higher fatty acid having a certain length of $C_{12}$ to $C_{22}$ carbon atoms, such as stearic, lauric, behenic, palmitic, and myristic acid, may be employed as disclosed in said U.S. Patent No. 2,913,342. Similarly, other esters such as partial esters of glycerine and a like fatty acid, especially mono- and di-glycerides, e.g., glycerol monostearate, glycerol monopalmitate, glycerol monooleate, etc., but also polyglycerol esters, e.g., decaglycerol decastearate; esters of sorbitol and a like fatty acid as well as polyoxyalkylene derivatives thereof; mixed esters obtained as products from the reaction of a hydroxy carboxylic acid and partial glycol esters and/or partial glycerol esters, e.g., citric acid ester of propylene glycol monostearate, glycerol lacto palmitate, glycerol lacto stearate, glycerol lacto oleate, etc.; and mixtures thereof may be utilized. Also, instead of the hydroxylated lecithin of the above examples, any phosphatidic composition may be employed in combination with such esters.

What is claimed is:

1. A dried emulsion comprising a fat phase of discrete fat particles containing an emulsifying agent and a non-fat phase comprising edible encapsulating solids selected from the group consisting of carbohydrate materials, proteinaceous materials, and mixtures thereof, said fat phase at temperatures below about 86° F. having a solids content of not less than 19.6 percent and a liquid content of not more than 80.4 percent, and at temperatures above about 104° F. having a solids content of not more than 12 percent and a liquid content of not less than 88 percent, said fat phase having a crystalline structure both above and below body temperature, and a solids content index of at least 3 at a temperature of 110° F. to stabilize said fat phase in dispersed particle form.

2. A dried emulsion according to claim 1 wherein the fat phase has a solids content index of not less than 30 at 70° F. and a sharp plastic range at mouth temperature.

3. A dried emulsion according to claim 1 wherein the fat phase has a solids content index of not less than 3 nor more than 8 at 110° F. and a sharp plastic range at mouth temperature.

4. A dried emulsion according to claim 1 wherein the fat phase has a solids content index of 50 to 75 at 50° F., 30 to 75 at 70° F., 3 to 13 at 100° F., and 3 to 8 at 110° F., and a sharp plastic range at mouth temperature.

5. A dried emulsion comprising a fat phase of discrete fat particles containing an emulsifying agent and a non-fat phase comprising edible encapsulating solids selected from the group consisting of carbohydrate materials, proteinaceous materials, and mixtures thereof, said fat phase having a sharp plastic range between room temperature and body temperature, the decrease in solids content of said fat phase between 70° F. and 100° F. being at least about 48 percent.

6. A dried emulsion comprising a fat phase of discrete fat particles containing an edible partial ester of a glycol and a higher saturated fatty acid and a non-fat phase comprising edible encapsulating solids selected from the group consisting of carbohydrate materials, proteinaceous materials, and mixtures thereof, said fat phase at temperatures below about 86° F. having a solids content of not less than 19.6 percent and a liquid content of not more than 80.4 percent, and at temperatures above about 104° F. having a solids content of not more than 12 percent and a liquid content of not less than 88 percent, said fat phase having a crystalline structure both above and below body temperature, and a solids content index of at least 3 at a temperature of 110° F. to stabilize said fat phase in dispersed particle form.

7. A dried emulsion according to claim 6 wherein the emulsion also contains lecithin.

8. A dried emulsion according to claim 6 wherein the fat phase has a sharp plastic range at mouth temperature.

9. A dried emulsion according to claim 6 wherein the fat phase has a solids content index of not less than 30 at 70° F. nor less than 8 at 100° F. and a sharp plastic range at mouth temperature.

10. A dried emulsion according to claim 6 wherein the fat phase has a solids content index of not less than 3 nor more than 8 at 110° F. and a sharp plastic range at mouth temperature.

11. A dried emulsion, comprising a fat phase of discrete fat particles containing an edible partial ester of a glycol and a higher saturated fatty acid, and a non-fat phase comprising edible encapsulating solids selected from the group consisting of carbohydrate materials, proteinaceous materials, and mixtures thereof, said fat phase having a sharp plastic range between room temperature and body temperature, the solids content index of said fat phase being 60 to 75 at 70° F., 8 to 12 at 100° F. and at least 3 at 110° F.

12. A dried emulsion, comprising a fat phase of discrete fat particles containing an edible partial ester of a glycol and a higher saturated fatty acid, and a non-fat phase comprising edible encapsulating solids selected from the group consisting of carbohydrate materials, proteinaceous materials, and mixtures thereof, said fat phase having a sharp plastic range between room temperature and body temperature, the solids content index of said fat phase being 60 to 75 at 70° F., 8 to 12 at 100° F. and 3 to 8 at 110° F.

13. A dried emulsion, comprising a fat phase of discrete fat particles containing an edible partial ester of a glycol and a higher saturated fatty acid, and a non-fat phase comprising edible encapsulating solids selected from the group consisting of carbohydrate materials, proteinaceous materials, and mixtures thereof, said fat phase having a sharp plastic range between room temperature and body temperature, the decrease in solids content of said fat phase between 70° F. and 100° F. being at least about 48 percent.

14. A dried emulsion, comprising a fat phase of discrete fat particles containing an edible partial ester of a glycol and a higher saturated fatty acid, and a non-fat phase comprising edible encapsulating solids selected from the group consisting of carbohydrate materials, proteinaceous materials, and mixtures thereof, said fat phase having a sharp plastic range between room temperature and body temperature, the solids content index of said fat phase being about 70 at 70° F., 36 at 80° F., 10 at 92° F., 8 at 100° F., and 4 at 110° F.

References Cited by the Examiner

UNITED STATES PATENTS 2,913,342  11/1959  Cameron et al. _____ 99—123 X
3,098,748  7/1963  Noznick et al. _____ 99—118

A. LOUIS MONACELL, *Primary Examiner.*

M. W. GREENSTEIN, *Assistant Examiner.*